(12) United States Patent
Lo

(10) Patent No.: US 12,194,499 B2
(45) Date of Patent: Jan. 14, 2025

(54) VIBRATING APPARATUS

(71) Applicant: TUNG KENG ENTERPRISE CO., LTD., Taichung (TW)

(72) Inventor: Chiu-Hsiang Lo, Taichung (TW)

(*) Notice: Subject to any disclaimer, the term of this patent is extended or adjusted under 35 U.S.C. 154(b) by 0 days.

(21) Appl. No.: 18/372,138

(22) Filed: Sep. 25, 2023

(65) Prior Publication Data
US 2024/0149303 A1 May 9, 2024

(30) Foreign Application Priority Data

Nov. 8, 2022 (TW) ................................. 111212236

(51) Int. Cl.
*B06B 1/10* (2006.01)
*F16H 7/02* (2006.01)
*F16H 7/08* (2006.01)

(52) U.S. Cl.
CPC ................. *B06B 1/10* (2013.01); *F16H 7/02* (2013.01); *F16H 7/08* (2013.01); *F16H 2007/0802* (2013.01); *F16H 2007/0874* (2013.01)

(58) Field of Classification Search
CPC .... A61H 1/005; Y10T 74/1828; B28D 1/068; B06B 1/12; B60D 1/10; B60D 1/14; F16H 2007/0802; F16H 7/02; F16H 21/28; F16H 21/18
See application file for complete search history.

(56) References Cited

U.S. PATENT DOCUMENTS

| | | | |
|---|---|---|---|
| 8,758,205 B2* | 6/2014 | Huang | A61H 23/0254 |
| | | | 482/146 |
| 2008/0125679 A1* | 5/2008 | Ezenwa | A61H 1/005 |
| | | | 601/49 |
| 2019/0053969 A1* | 2/2019 | Tait | A61H 1/005 |

* cited by examiner

*Primary Examiner* — Gregory Robert Weber
(74) *Attorney, Agent, or Firm* — Bruce Stone LLP; Joseph A. Bruce

(57) ABSTRACT

A vibrating apparatus includes two axles, two composite wheels, a timing belt, a multi-ridged belt and four rods. The axles are parallel to each other. Each of the axles includes two eccentric sections. The composite wheels are respectively connected to the axles. Each of the composite wheels includes a timing pulley and a multi-ridged pulley coaxially in one piece with the timing pulley. The timing belt is wound around the timing pulleys. The multi-ridged belt is wound around the multi-ridged pulley. The rods are pivotally connected to the eccentric sections of the axles.

9 Claims, 7 Drawing Sheets

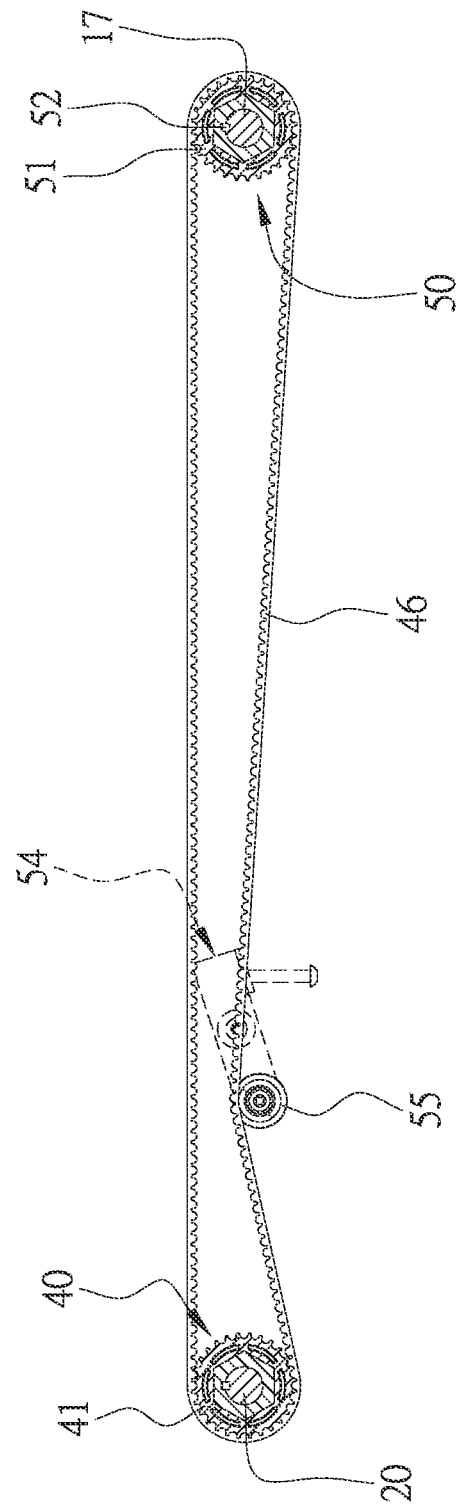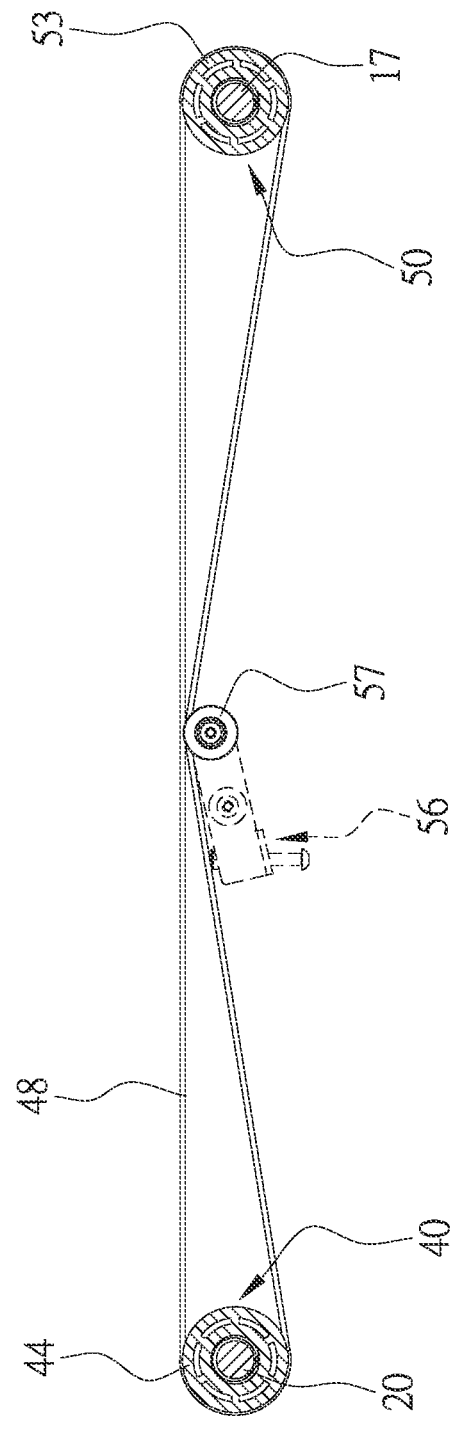
Fig. 6
Fig. 7

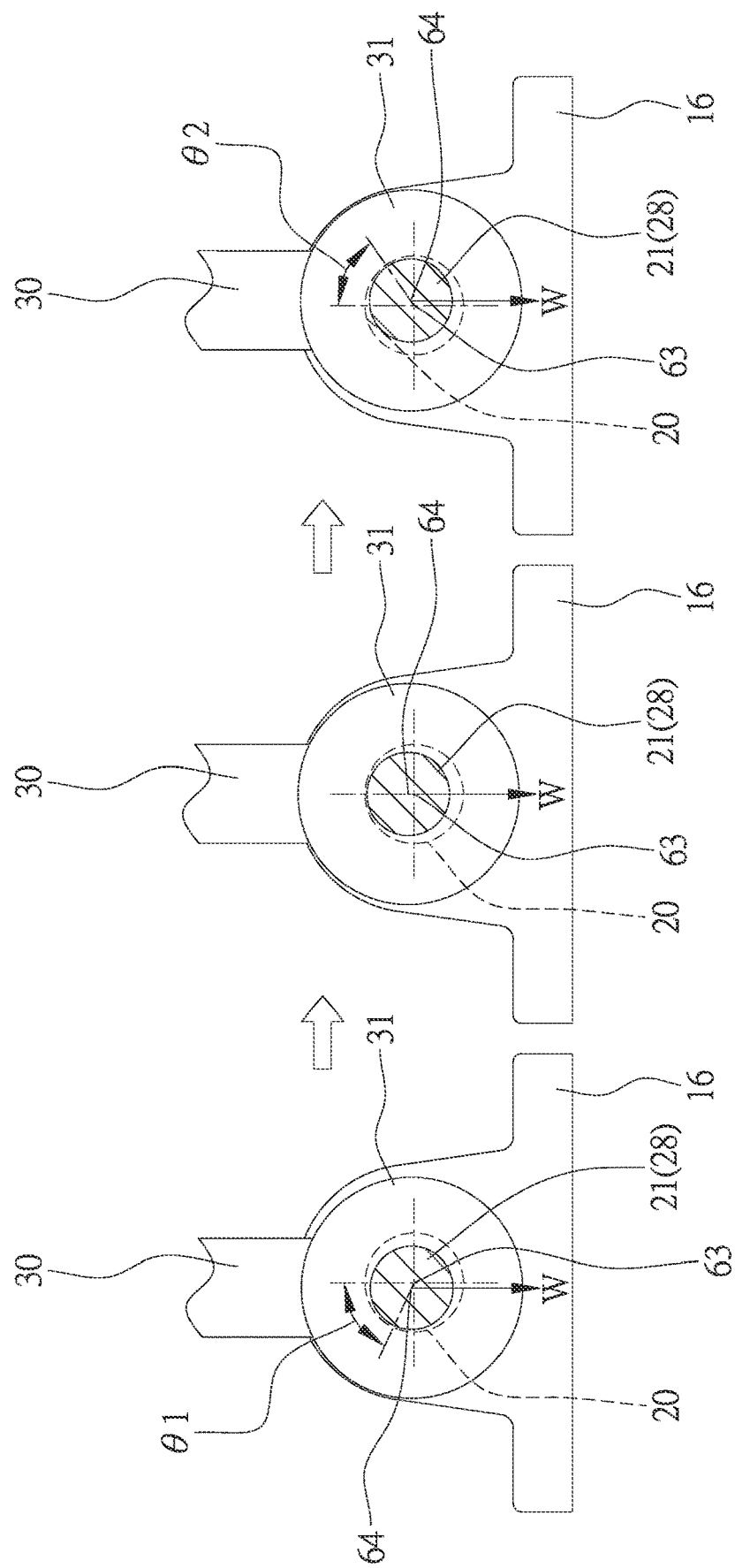

VIBRATING APPARATUS

BACKGROUND OF INVENTION

1. Field of Invention

The present invention relates to a vibrating apparatus and, more particularly, to a quiet vibrating apparatus.

2. Related Prior Art

Vibrating apparatuses are used to provide users with massage or improve circulation of blood in the users. A conventional vibration apparatus is operable to provide reciprocated horizontal and/or vertical movement. To this end, such a conventional vibration apparatus includes a complicated linkage or gear train to convert rotation of a motor to such reciprocated horizontal and/or vertical movement. However, such a complicated linkage or gear train inevitably produces noise that is sometimes unbearable for a user. Moreover, the rate of such reciprocated horizontal and/or vertical movement changes abruptly and makes a user uncomfortable.

The present invention is therefore intended to obviate or at least alleviate the problems encountered in the prior art.

SUMMARY OF INVENTION

It is the primary objective of the present invention to provide a cozy and quiet vibrating apparatus.

To achieve the foregoing objective, the vibrating apparatus includes two axles, two composite wheels, a timing belt, a multi-ridged belt and four rods. The axles are parallel to each other. Each of the axles includes two eccentric sections. The composite wheels are respectively connected to the axles. Each of the composite wheels includes a timing pulley and a multi-ridged pulley coaxially in one piece with the timing pulley. The timing belt is wound around the timing pulleys. The multi-ridged belt is wound around the multi-ridged pulley. The rods are pivotally connected to the eccentric sections of the axles.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein:

FIG. 6 is a cross-sectional view of the vibrating apparatus shown in FIG. 1;

FIG. 7 is another cross-sectional view of the vibrating apparatus shown in FIG. 1;

FIG. 8 is a cross-sectional view of the first portion of the vibrating apparatus shown in FIG. 3;

FIG. 9 is a cross-sectional view of the first portion of the vibrating apparatus in another position than shown in FIG. 8; and FIG. 10 is a cross-sectional view of the first portion of the vibrating apparatus in another position than shown in FIG. 9.

DETAILED DESCRIPTION OF PREFERRED EMBODIMENT

Figure 1:
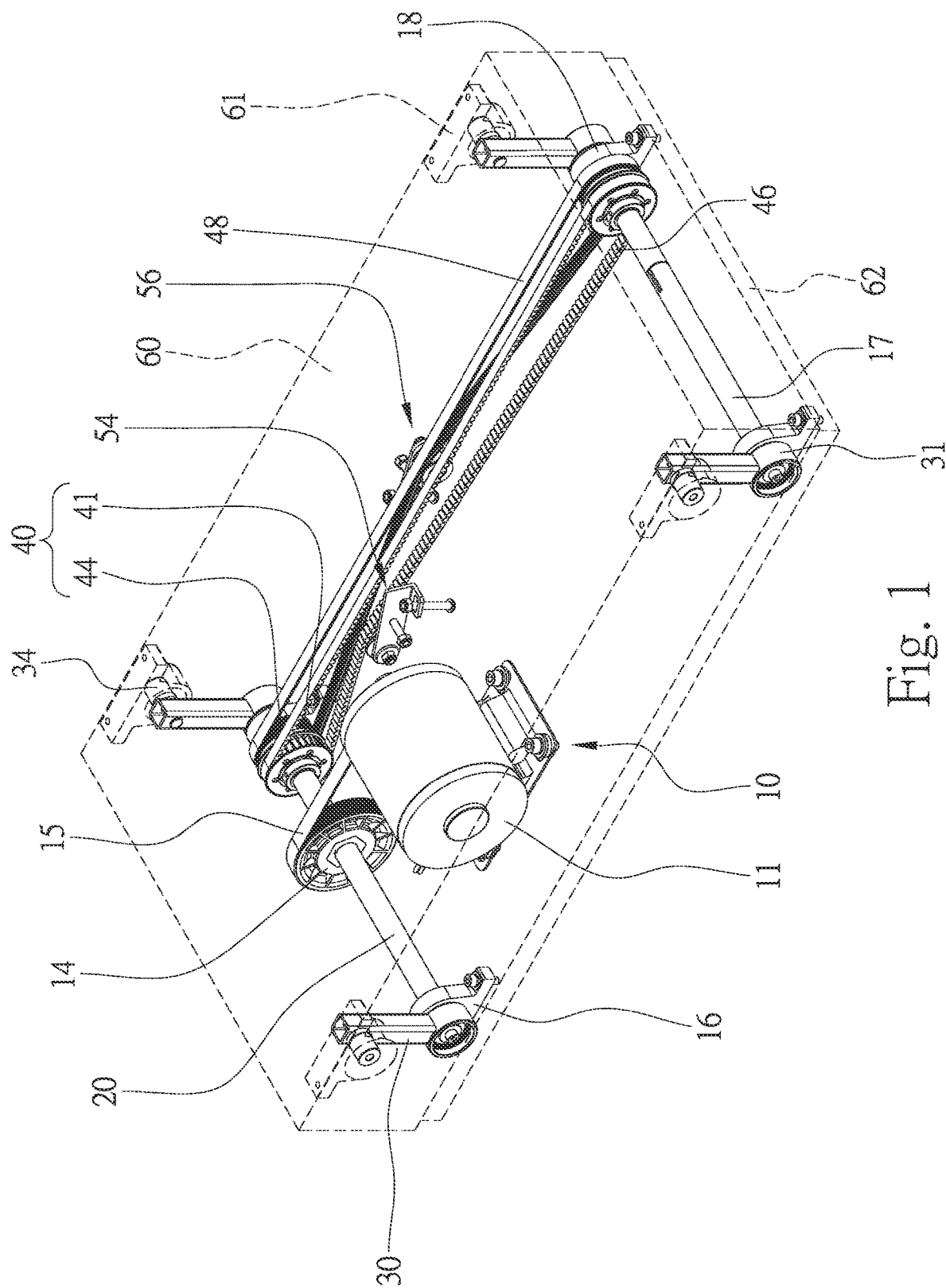
FIG. 1 is perspective view of a vibrating apparatus according to the preferred embodiment of the present invention.
Figure 2:
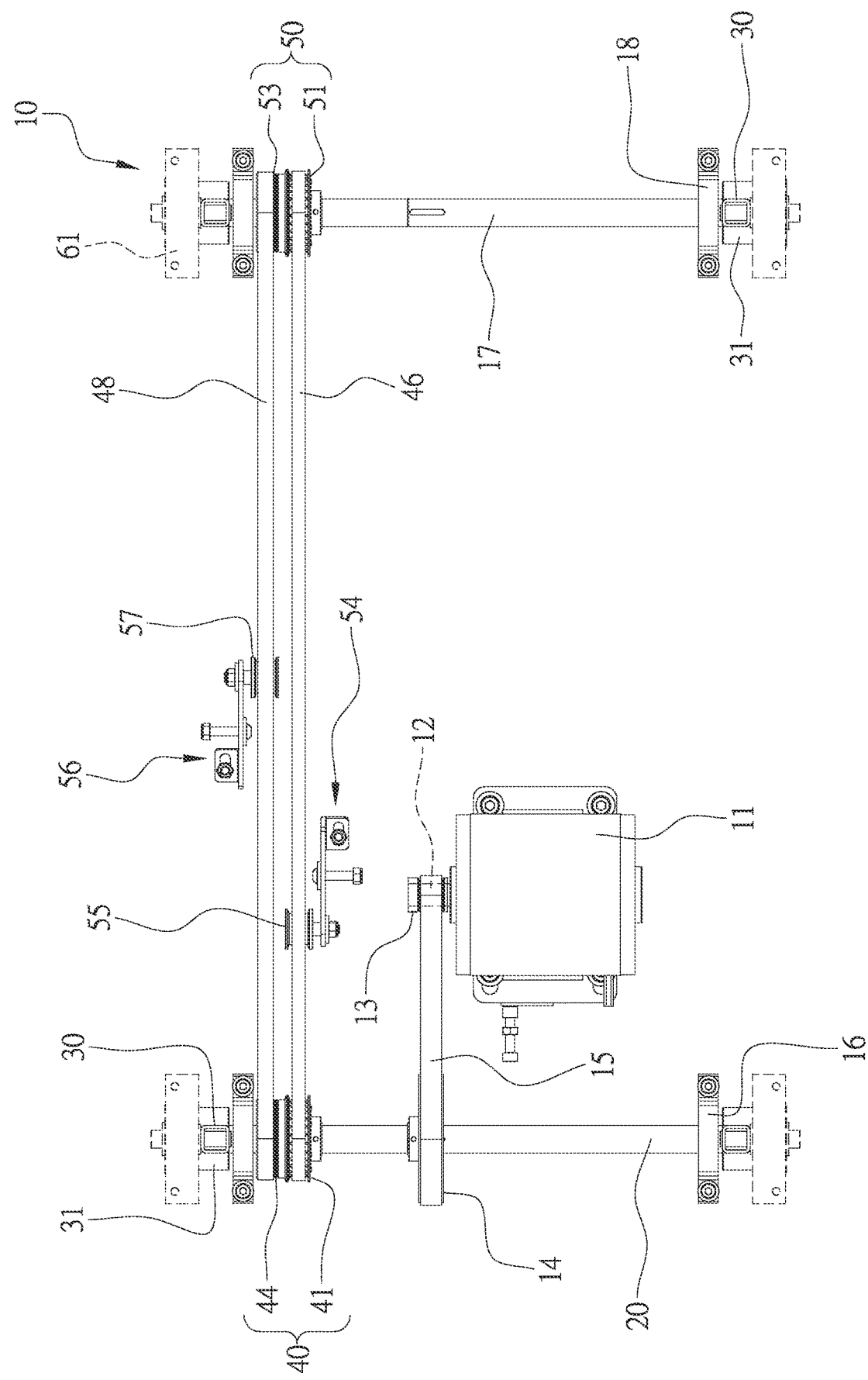
FIG. 2 is a top view of the vibrating apparatus shown in FIG. 1 without a cover and a base.

Referring to FIGS. 1 and 2, a vibrating apparatus 10 includes a housing for containing a mechanism according to the preferred embodiment of the present invention. The housing includes a cover 60 for covering a base 62 to provide a space for containing the mechanism. The cover 60 is movable up and down relative to the base 62.

The mechanism includes a motor 11, two axles 17 and 20, and four rods 30. The motor 11 and the axles 17 and 20 are supported on the base 62. Each of the rods 30 includes a lower end pivotally connected to the axle 17 or 20 and an upper end pivotally connected to the cover 60. The motor 11 is operable to rotate the axles 17 and 20 to move the rods 30 to move the cover 60 up and down relative to the base 62.

The axles 17 and 20 are parallel to each other. The axle 17 is supported on the base 62 by two bearings 18. The axle 20 is supported on the base 62 by two bearings 16. The bearings 16 are like the bearings 18.

Figure 3:
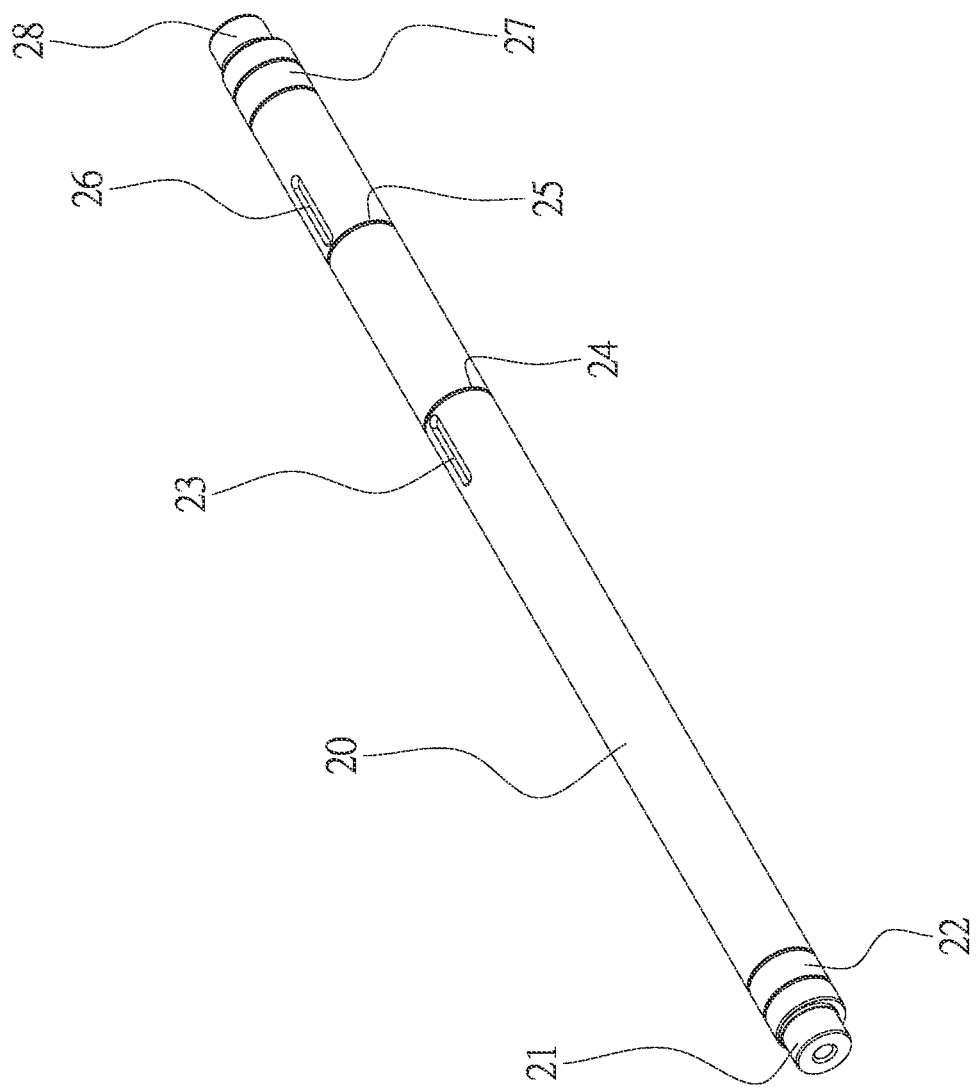
FIG. 3 is a perspective view of an axle of the vibrating apparatus shown in FIG. 1.

The axles 17 and 20 are identical to each other. Referring to FIG. 3, only the axle 20 will be described in detail. The axle 20 includes two borne sections 22 and 27 respectively supported by bearings 16 so that the axle 20 is allowed to spin relative to the base 62.

The motor 11 includes a mandrel 12. A pulley 13 is connected to the mandrel 12. A pulley 14 is connected to the axle 20. A belt 15 extends around the pulleys 13 and 14. Thus, the motor 11 is operable to rotate the axle 20. Preferably, the motor 11 is located between the axles 20 and 17. However, in another embodiment, the motor 11 can be in another location relative to the axles 20 and 17.

To prevent rotation of the pulley 14 relative to the axle 20, a keyed joint is used. The keyed joint includes a key 52 formed with a portion fitted in a slit 23 in the axle 20 (FIG. 3) and another portion fitted in a slit (not numbered) in the pulley 14.

To prevent translation of the pulley 14 along the axle 20, two clips (not shown) can be located on two opposite sides of the pulley 14. Each of the clips includes an internal portion fitted in a groove 24 (FIG. 3) in the axle 20 and an external portion in contact with the pulley 14.

A composite wheel 40 is connected to the axle 20. A composite wheel 50 is connected to the axle 17. A timing belt 46 and a multi-ridged belt 48 extend around the composite wheels 40 and 50 to allow synchronous rotation of the axles 17 and 20.

Figure 4:
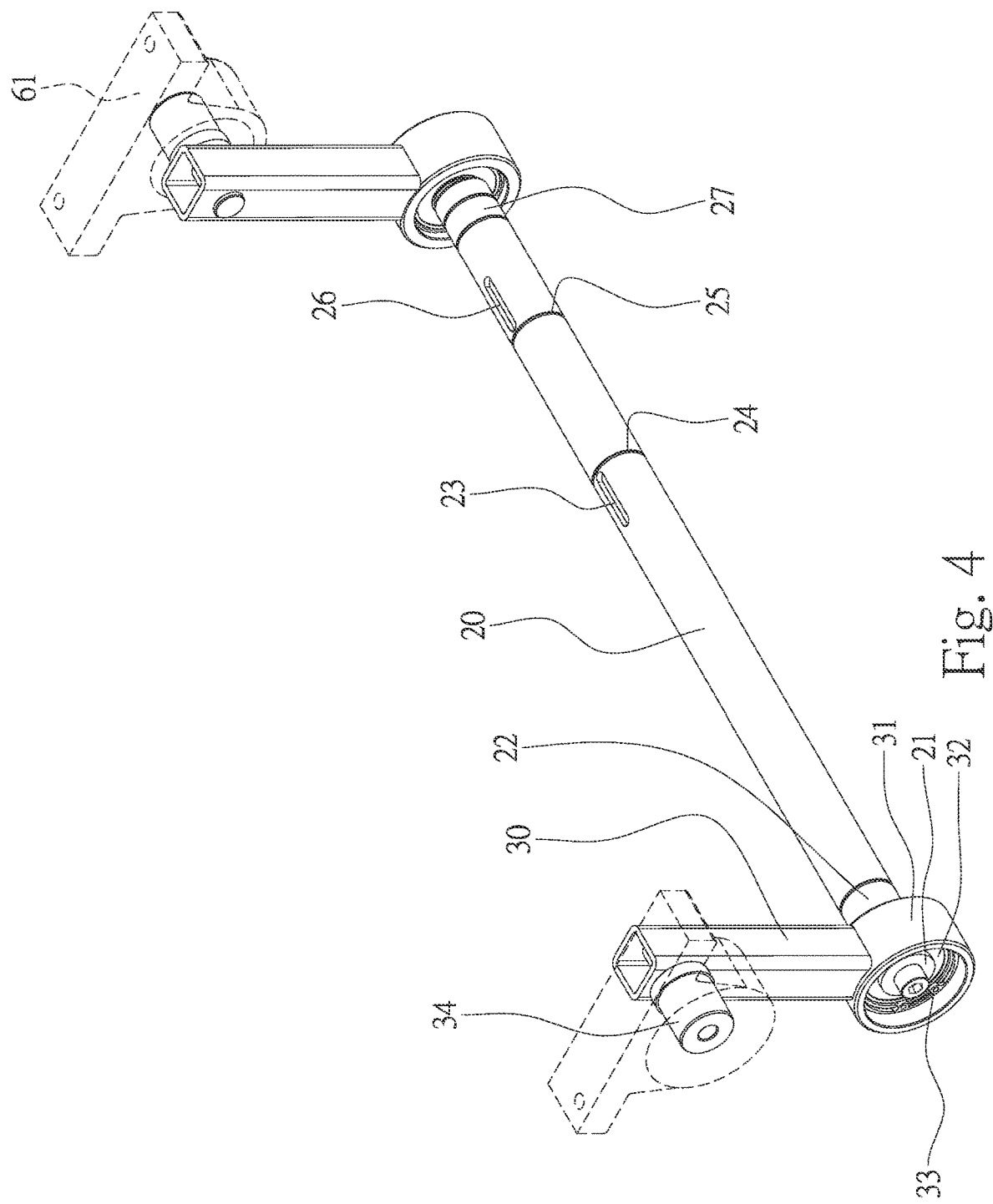
FIG. 4 is a perspective view of a first portion of the vibrating apparatus shown in FIG. 1.
Figure 5:
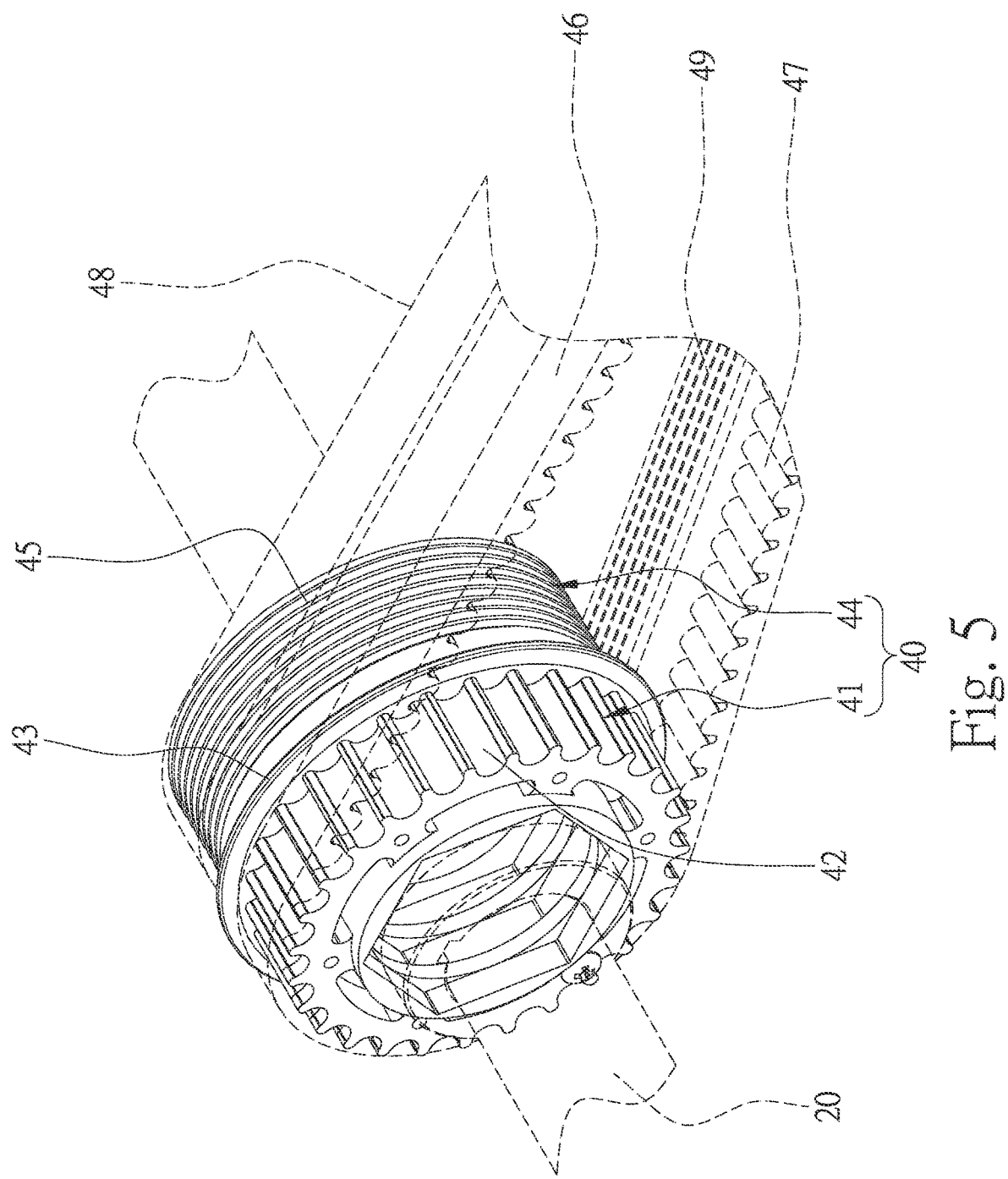
FIG. 5 is a perspective view of a second portion of the vibrating apparatus shown in FIG. 1.

Referring to FIG. 4, the composite wheel 40 includes a timing pulley 41, a multi-ridged pulley 44 and a separating element 43 formed between the timing pulley 41 and the multi-ridged pulley 44. The timing pulley 41 includes valleys 42 in the periphery. The multi-ridged pulley 44 includes annular ridges 45 in the periphery.

The composite wheel 50 includes a timing pulley 51 and a multi-ridged pulley 53 and a separating element (not numbered) formed between the timing pulley 51 and the multi-ridged pulley 53. The timing pulley 51 includes valleys (not numbered) in the periphery. The multi-ridged pulley 53 includes annular ridges (not numbered) in the periphery. That is, the composite wheel 50 is identical to the composite wheel 40.

The timing belt 46 includes teeth 47 for insertion in the valleys of the timing pulleys 41 and 51 when the timing belt 46 is wound around the timing pulleys 41 and 51. Referring to FIG. 6, there is preferably a tension-adjusting unit 54 located on the base 62 to adjust the tension in the timing belt 46. The tension-adjusting unit 54 includes an idle pulley 55 in contact with the timing belt 46.

The multi-ridged belt 48 includes ridges 49 in contact with the annular ridges of the multi-ridged pulleys 44 and 53 when the multi-ridged belt 48 is wound around the multi-ridged pulleys 44 and 53. Referring to FIG. 7, there is preferably a tension-adjusting unit 56 located on the base 62 to adjust the tension in the multi-ridged belt 48. The tension-adjusting unit 56 includes an idle pulley 57 in contact with the multi-ridged belt 48.

To prevent rotation of the composite wheel 40 relative to the axle 20, a portion of a key 52 is fitted in a slit 26 in the axle 20 (FIG. 3) and another portion of the key 52 is fitted in a slit (not numbered) in the composite wheel 40.

Similarly, the composite wheel 50 is prevented from rotation relative to the axle 17.

To prevent translation of the composite wheel 40 along the axle 20, two clips 33 are located on two opposite sides of the composite wheel 40. Each of the clips 33 includes an internal portion fitted in a groove 25 (FIG. 3) in the axle 20 and an external portion in contact with the composite wheel 40.

Similarly, the composite wheel 50 is prevented from translation along to the axle 17.

Referring to FIGS. 2, 3 and 8 through 10, the axle 20 further includes two eccentric sections 21 and 28 respectively extending from the borne sections 22 and 27. The axle 20 extends about a primary axis 63 except for that the eccentric sections 21 and 28 extend about a secondary axis 64 parallel to the primary axis 63.

Similarly, the axle 17 includes two eccentric sections.

Each of the rods 30 includes a collar 31 at a lower end and a pivot 34 at an upper end. The collar 31 of each of the rods 30 receives one of the eccentric sections of one of the axles 17 and 20 via a bearing 32. The collars 31 are kept in position axially by clips 33. Each of the pivots 34 is inserted in one of the bearings 61.

The motor 11 is operable to rotate the axle 20 via the pulleys 13 and 14 and the driving belt 15. The axle 20 rotates the axle 17 via the wheels 40 and 50 and the timing belts 46 and the multi-ridged belts 48. The eccentric sections of the axles 20 and 17 move the collar 31 of the rods 30 up and down so that the rods 30 move the cover 60 up and down relative to the base 62.

Referring to FIG. 8, there is an angle θ1 between a vertical line and a line passing the primary axis 63 and the secondary axis 64. The axles 20 and 17 are lifting the rods 30. A load W is working against the torque provided by the motor 11 for the rotation of the axles 20 and 17.

Referring to FIG. 9, the vertical line coincides with the line that passes the primary axis 63 and the secondary axis 64. The rods 30 are at their apex.

Referring to FIG. 10, there is an angle θ2 between the vertical line and the line that passes the primary axis 63 and the secondary axis 64. The axles 20 and 17 are lowering the rods 30. The load W is working with the torque provided by the motor 11 for the rotation of the axles 20 and 17.

Obviously, the upward movement of the cover 60 relative to the base 62 is slower the downward movement of the cover 60 relative to the base 62. The difference in the speed of the movement of the cover 60 relative to the base 62 makes a user feel uncomfortable. Advantageously, the friction between the annular ridges of the multi-ridged pulleys 44 and 53 and the ridges of the multi-ridged belts 48 minimizes the difference in the speed of the movement of the cover 60 relative to the base 62. Thus, the uncomfortable feeling of the user is suppressed. Moreover, the contact of the annular ridges of the multi-ridged pulleys 44 and 53 with the ridges of the multi-ridged belts 48 suppresses undesirable movement of the wheels 40 and 50 along the axles 20 and 17, thereby reducing resultant nose.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A vibrating apparatus comprising:
   two axles parallel to each other, wherein each of the axles comprises two eccentric sections;
   two composite wheels respectively connected to the axles, wherein each of the composite wheels comprises a timing pulley and a multi-ridged pulley coaxially in one piece with the timing pulley;
   a timing belt wound around the timing pulleys;
   a multi-ridged belt wound around the multi-ridged pulleys; and
   four rods pivotally connected to the eccentric sections of the axles.

2. The vibrating apparatus according to claim 1, wherein each of the rods comprises a collar for receiving a corresponding one of the eccentric sections of a corresponding one of the axles.

3. The vibrating apparatus according to claim 1, further comprising:
   a motor comprising a mandrel;
   a first pulley connected to the mandrel;
   a second pulley connected to one of the axles; and
   a driving belt wound around the first and second pulleys.

4. The vibrating apparatus according to claim 3, further comprising:
   a base;
   four lower bearings for connecting the axles to the base;
   a cover movable up and down relative to the base; and
   four upper bearings for connecting the rods to the cover.

5. The vibrating apparatus according to claim 4, wherein each of the rods comprises a pivot inserted in a corresponding one of the bearings.

6. The vibrating apparatus according to claim 4, comprising a first tension-adjusting unit for adjusting tension in the timing belt.

7. The vibrating apparatus according to claim 6, wherein the first tension-adjusting unit comprises a first idle pulley in contact with the timing belt.

8. The vibrating apparatus according to claim 4, comprising a second tension-adjusting unit for adjusting tension in the multi-ridged belt.

9. The vibrating apparatus according to claim 8, wherein the second tension-adjusting unit comprises a second idle pulley in contact with the multi-ridged belt.

* * * * *